(12) United States Patent
Sakagami

(10) Patent No.: US 8,789,508 B2
(45) Date of Patent: Jul. 29, 2014

(54) AIR-INTAKE APPARATUS FOR INTERNAL COMBUSTION ENGINE

(75) Inventor: Eiji Sakagami, Chiryu (JP)

(73) Assignee: Aisin Seiki Kabushiki Kaisha, Kariya-Shi, Aichi-Ken (JP)

(*) Notice: Subject to any disclaimer, the term of this patent is extended or adjusted under 35 U.S.C. 154(b) by 375 days.

(21) Appl. No.: 13/256,751

(22) PCT Filed: Mar. 2, 2010

(86) PCT No.: PCT/JP2010/053308
§ 371 (c)(1),
(2), (4) Date: Sep. 15, 2011

(87) PCT Pub. No.: WO2010/131512
PCT Pub. Date: Nov. 18, 2010

(65) Prior Publication Data
US 2012/0000438 A1    Jan. 5, 2012

(30) Foreign Application Priority Data
May 12, 2009 (JP) ................................. 2009-115679

(51) Int. Cl.
*F02M 35/10* (2006.01)
(52) U.S. Cl.
USPC ................................ 123/184.55; 123/184.56
(58) Field of Classification Search
CPC ............ F02M 35/10255; F02M 35/10; F02M 35/104; F02M 35/10122; F02M 35/1034; F02M 35/10065; F02M 35/10032; F02M 35/10091; F02M 35/10111; F02M 35/10118; F02M 35/10301; F02B 27/02; F02B 27/0215; F02B 27/0263; F02B 27/0284; F02B 27/0278; F02B 27/0268
USPC ........................................ 123/184.55, 184.56
See application file for complete search history.

(56) References Cited

U.S. PATENT DOCUMENTS

| | | | |
|---|---|---|---|
| 4,932,369 A | 6/1990 | Parr | |
| 6,138,628 A | 10/2000 | Alex et al. | |

(Continued)

FOREIGN PATENT DOCUMENTS

| | | |
|---|---|---|
| CN | 1319719 A | 10/2001 |
| DE | 19954455 A1 | 5/2001 |

(Continued)

OTHER PUBLICATIONS

International Search Report (PCT/ISA/210) issued on Apr. 6, 2010, by Japanese Patent Office as the International Searching Authority for International Application No. PCT/JP2010/053308.

(Continued)

*Primary Examiner* — Noah Kamen
(74) *Attorney, Agent, or Firm* — Buchanan Ingersoll & Rooney PC

(57) ABSTRACT

In order to provide a small air-intake apparatus for an internal combustion engine, which can satisfactorily control an air flow and can reduce energy loss in a rotary valve, the air-intake apparatus includes a surge tank; a first air-intake passage communicating with the surge tank; a second air-intake passage communicating with the surge tank; a casing including a first port connected to the first air-intake passage, a second port connected to the second air-intake passage, and an outlet port connected to an air-intake portion of the internal combustion engine; a rotary valve including a rotor housed in a valve casing portion of the casing to be rotatable about a rotational axis, the rotary valve being configured to control air intake directed to the air-intake portion by rotation of the rotor; and a first seal for sealing between the rotor and a surface of the valve casing portion facing the rotor with at least either one of the first port, second port and outlet port being closed.

10 Claims, 16 Drawing Sheets

(56) References Cited

U.S. PATENT DOCUMENTS

| | | |
|---|---|---|
| 6,588,389 B1 | 7/2003 | Jessberger et al. |
| 7,484,490 B2 | 2/2009 | Teschner et al. |
| 2001/0010213 A1 | 8/2001 | Umino et al. |
| 2002/0139340 A1 | 10/2002 | Matsumoto et al. |
| 2009/0288629 A1 | 11/2009 | Ito et al. |
| 2010/0083929 A1 | 4/2010 | Sakagami et al. |

FOREIGN PATENT DOCUMENTS

| | | |
|---|---|---|
| DE | 10218176 A1 | 11/2003 |
| EP | 0355960 A2 | 2/1990 |
| EP | 0636774 A1 | 2/1995 |
| FR | 2869357 A1 | 10/2005 |
| JP | 62-7923 A | 1/1987 |
| JP | 62-174529 A | 7/1987 |
| JP | 2001-519006 A | 10/2001 |
| JP | 2002-130063 A | 5/2002 |
| JP | 2002-130064 A | 5/2002 |
| JP | 2003-106155 A | 4/2003 |
| JP | 2005-113873 A | 4/2005 |
| JP | 2007-9700 A | 1/2007 |
| JP | 2007-9795 A | 1/2007 |
| JP | 2008-215180 A | 9/2008 |
| WO | WO 2008/010589 A1 | 1/2008 |

OTHER PUBLICATIONS

Written Opinion (PCT/ISA/237) issued on Apr. 6, 2010, by Japanese Patent Office as the International Searching Authority for International Application No. PCT/JP2010/053308.

Notification of Transmittal of Translation of the International Preliminary Report on Patentability (Forms PCT/IB/338 and PCT/IB/373) and the Written Opinion of the International Searching Authority (Form PCT/ISA/237) issued on Dec. 22, 2011, in the corresponding International Application No. PCT/JP2010/053308.

Office Action (Notification of the First Office Action) dated Feb. 25, 2013, issued in corresponding Chinese Patent Application No. 201080012510.0, and an English Translation of the Office Action. (15 pages).

European Search Report issued on Nov. 15, 2013, by the European Patent Office, in corresponding European Patent Application No. 10774771.9 (5 pages).

AIR-INTAKE APPARATUS FOR INTERNAL COMBUSTION ENGINE

TECHNICAL FIELD

The present invention relates to an air-intake apparatus for an internal combustion engine. More particularly, the present invention relates, in an apparatus provided with a rotary valve for switching a length of a passage for supplying air from a surge tank to an air-intake portion of the engine depending on a driving speed of the engine, to improvement of a sealing construction of the rotary valve.

BACKGROUND ART

As one relevant apparatus of the air-intake apparatus as arranged above, Patent Document 1 discloses a construction comprising an intake manifold including a branched tube portion for introducing air in the surge tank to the engine, a bypass air-intake passage for directing the air in the surge tank to a terminal portion of the intake manifold, and a rotary valve for allowing or breaking communication with the bypass passage. In the apparatus of Patent Document 1, the bypass passage is closed with the rotary valve when the engine is rotated at low seed, thereby to achieve an inertia supercharging effect by supplying air through the intake manifold with a long air-intake passage. On the other hand, when the engine is rotated at high speed, the rotary valve allows the communication with the bypass passage, thereby to supply a large amount of air can be supplied with a short air-intake passage.

With the air-intake apparatus of Patent Document 1, the rotary valve includes a casing and a rotor. Further, since the inertial supercharging effect is marred when the air flows from the bypass passage with the air being supplied with a long air-intake passage, a gasket is provided between the rotor and the casing. As a specific construction for providing the gasket, the rotor includes an annular groove extending along an outer circumference of the rotor in a circumferential direction and a linear groove extending along a rotational axis. The gasket includes an arc sealing portion fitted into the annular groove and a linear sealing portion fitted into the linear groove, both of which are integrally formed with each other. With such a construction, the arc sealing portion is fitted into the arc groove while the linear sealing portion is fitted into the linear groove, thereby to allow the gasket to be supported to the outer surface of the rotor.

On the other hand, Patent Document 2 discloses a construction comprising a rotatable switching roller (corresponding to the rotary valve of the present invention) for switching the length of an air-intake tube in the similar manner to the apparatus of Patent Document 1, and a sealing element provided in the switching roller for enhancing the sealing efficiency. The sealing element includes a pair of linear sealing pieces extending parallel to each other and ring elements provided in opposite ends of the sealing pieces, which are integrally formed with each other. The sealing element is fitted into an outer surface of the switching roller to be engageably supported.

RELEVANT ART DOCUMENT

Patent Document

Patent Document 1: Japanese Unexamined Patent Application Publication No. 2005-113873 (paragraphs 0025 to 0033; FIGS. 1 to 5)

Patent Document 2: Japanese Patent Application National Publication No. 2001-519006

SUMMARY OF THE INVENTION

Problem to be Solved by the Invention

In the construction in which the rotary valve for switching the length of the air-intake passage includes the casing and the rotor rotatably housed in casing, the apparatus as disclosed in Patent Document 1 or Patent Document 2 that has the sealing element provided in the outer surface of the rotor might cause disadvantages described below.

More particularly, the rotor includes an opening space for circulating the air and a wall-like portion for shutting off the air flow. Further, in order to securely prevent unwanted air leakage when the air flow is shut off at the wall-like portion, the sealing element is provided to project outward (outward in reference to the rotational axis) in the vicinity of the wall-like portion.

Since the wall-like portion is arranged in a position adjacent to the opening space, the sealing element is also arranged in a position adjacent to the air-circulating space. As understood from such a positional relationship, in the construction for providing the sealing element in the outer surface of the rotor, the sealing element projects outwardly of the rotor. As a result, the shapes of the wall-like portion and the air-circulating space cannot be suitable for air-flow control, which easily causes a disadvantage that the sealing element hampers the air flow in the opening space. In addition, in the construction for providing the sealing element in the outer surface of the rotor, even when a bore of the rotor or the casing is deformed, it is required to provide a space between the rotor and the sealing element in order to allow smooth rotation of the valve. Thus, the rotor has to have a large size (have a large diameter). Moreover, increase in size may lead to increase in sliding resistance or weight of the rotor.

As described above, in the apparatus in which the sealing element is provided to project from the outer surface of the rotor, the sealing element constantly comes into contact with the inner surface of the casing when the rotor is rotated about the rotational axis, as a result of which energy is wasted due to the sliding resistance.

Further, since the sealing element is provided in the rotor, when the space secured between the rotor and the casing becomes inconstant in a radial direction of the rotor due to vibration, for example, a gap is produced between the sealing element and the casing to lower the sealing efficiency. When vibration occurs, in particular, the rotor is intensively vibrated in a portion of the outer surface of the rotor where the sealing element is not provided to come into contact with the inner surface of the casing, thereby to produce an unusual sound.

As described above, the disadvantages such as difficulty in controlling the air flow, increase in size, energy loss, decrease in sealing efficiency, and occurrence of unusual sound are caused by the arrangement in which the sealing element is provided to project from the outer surface of the rotor. It is considered to be difficult to eliminate those disadvantages all at once.

The object of the present invention is to miniaturize an air-intake apparatus for an internal combustion engine for performing air-flow control satisfactorily and reducing energy loss in a rotary valve.

Means for Solving the Problem

The characteristic feature of the present invention lies in an air-intake apparatus for an internal combustion engine, comprising a surge tank; a first air-intake passage communicating with the surge tank; a second air-intake passage communicating with the surge tank; a casing including a first port connected to the first air-intake passage, a second port connected to the second air-intake passage, and an outlet port connected to an air-intake portion of the internal combustion engine; a rotary valve including a rotor housed in a valve casing portion of the casing to be rotatable about a rotational axis, the rotary valve being configured to control air intake directed to the air-intake portion by rotation of the rotor; and a first seal for sealing between the rotor and a surface of the valve casing portion facing the rotor with at least either one of the first port, second port and outlet port being closed.

With this construction, the first seal may be arranged so as not to seal the rotor and the valve casing portion when any of the ports is not closed, as a result of which the sliding resistance produced when the rotor is rotated can be reduced while the sealing function is maintained in the closed state. Further, it is not required to constantly seal the rotor and the valve casing portion, which can reduce the area where the first seal is provided, thereby to miniaturize the apparatus and easily make the shape of the rotor suitable for the air-flow control. This allows the air-flow control to be satisfactorily performed and miniaturizes the air-intake apparatus for the internal combustion engine that is capable of reducing energy loss in the rotary valve.

In the present invention, the first seal may be provided between an outer circumferential surface of the rotor and a surface of the valve casing portion facing the outer circumferential surface of the rotor.

With such a construction, since the air is prevented from leaking from between the outer circumferential surface of the rotor and the surface of the valve casing portion facing the outer circumferential surface of the rotor, the air-flow control can be performed more satisfactorily.

In the present invention, the first seal may prevent the rotor from contacting the surface of the valve casing portion facing the rotor.

With such a construction, it is prevented that the rotor and the valve casing portion are brought into contact with each other to generate an unusual sound even when vibration occurs.

In the present invention, the first seal may be provided in the valve casing portion and project toward the rotor.

With such a construction, it is not required to secure a space for allowing movement of the seal in association with rotation of the rotor unlike the construction providing the rotor with the seal, which can further miniaturize the apparatus. In addition, there is no need to provide the rotor with the seal, which enhance a degree of freedom for providing the rotor with a preferable shape from the viewpoint of air-flow control.

In the present invention, the first seal may be provided with a linear sealing surface extending along the rotational axis.

With such a construction, the rotor and the valve casing portion are satisfactorily sealed while the first seal has a simple configuration, which is cost-effective.

In the present invention, the first seal may be urged toward the rotor by an urging element.

With such a construction, the urging force of the urging element allows the projecting end of the sealing member to positively come into contact with the valve portion of the rotor, for example, to restrict the air flow, which can enhance the tight-sealing efficiency.

In the present invention, an annular or arc second seal centering around the rotational axis may be provided in the valve casing portion for sealing between the surface of the valve casing portion and a side surface or the outer circumferential surface of the rotor.

With such a construction, the air flow in the direction along the rotational axis in the position of the port can be controlled by the second seal, which enhances the sealing efficiency further.

In the present invention, the second seal may be engageable with the first seal.

With such a construction, the operational efficiency in assembling the first seal and the second seal to the apparatus is improved, and the tight-sealing efficiency is improved by sealing between the first seal and the second seal to prevent any gap from being produced.

In the present invention, the apparatus may have the following arrangements. More particularly, the casing includes a first casing and a second casing; the first casing and the second casing are connected to each other to form the valve casing portion; the first seal is fitted into the first casing and the second casing before the first casing and the second casing are connected to each other; and the rotor is arranged in the first casing or the second casing to assemble the rotary valve.

With such a construction, since the inner surface of the casing is widely opened in assembling the apparatus, the first seal can be supported to the inner surface of the casing by performing a simple assembling process. Further, it is also possible to retain the supported first seal by the rotor.

In the present invention, the apparatus may have the following arrangements. More particularly, a groove is formed in the valve casing portion along the rotational axis to have a larger width at the far side of the rotational axis than a width at the near side of the rotational axis in the circumferential direction of the rotational axis; and the first seal is supported to the valve casing portion by inserting the first seal having a cross section with a width at a proximal end portion thereof being larger than a width at a distal end portion thereof into the groove from a direction along the rotational axis.

With such a construction, the first seal can be retained and supported to the casing by inserting the first seal to the groove. Further, the gap between the groove and the first seal may be reduced to suppress vibration in the rotor.

In the present invention, the rotor may include a valve portion formed therein; and a cut-out portion may be formed in the valve portion for allowing an air flow to the outlet port when the valve portion closes the outlet port.

With such a construction, even if the valve portion is positioned to close the outlet port, the air flow is possible through the cut-out portion to restrain the supply of an excessive amount of air when the engine is rotated at low speed such as in the idling state, for example.

MODE FOR CARRYING OUT THE INVENTION

A first embodiment in which an air-intake apparatus for an internal combustion engine according to the present invention is applied to a vehicle having a four-cylinder engine will be described hereinafter in reference to the accompanying drawings.

FIRST EMBODIMENT

Overall Construction

Figure 1:
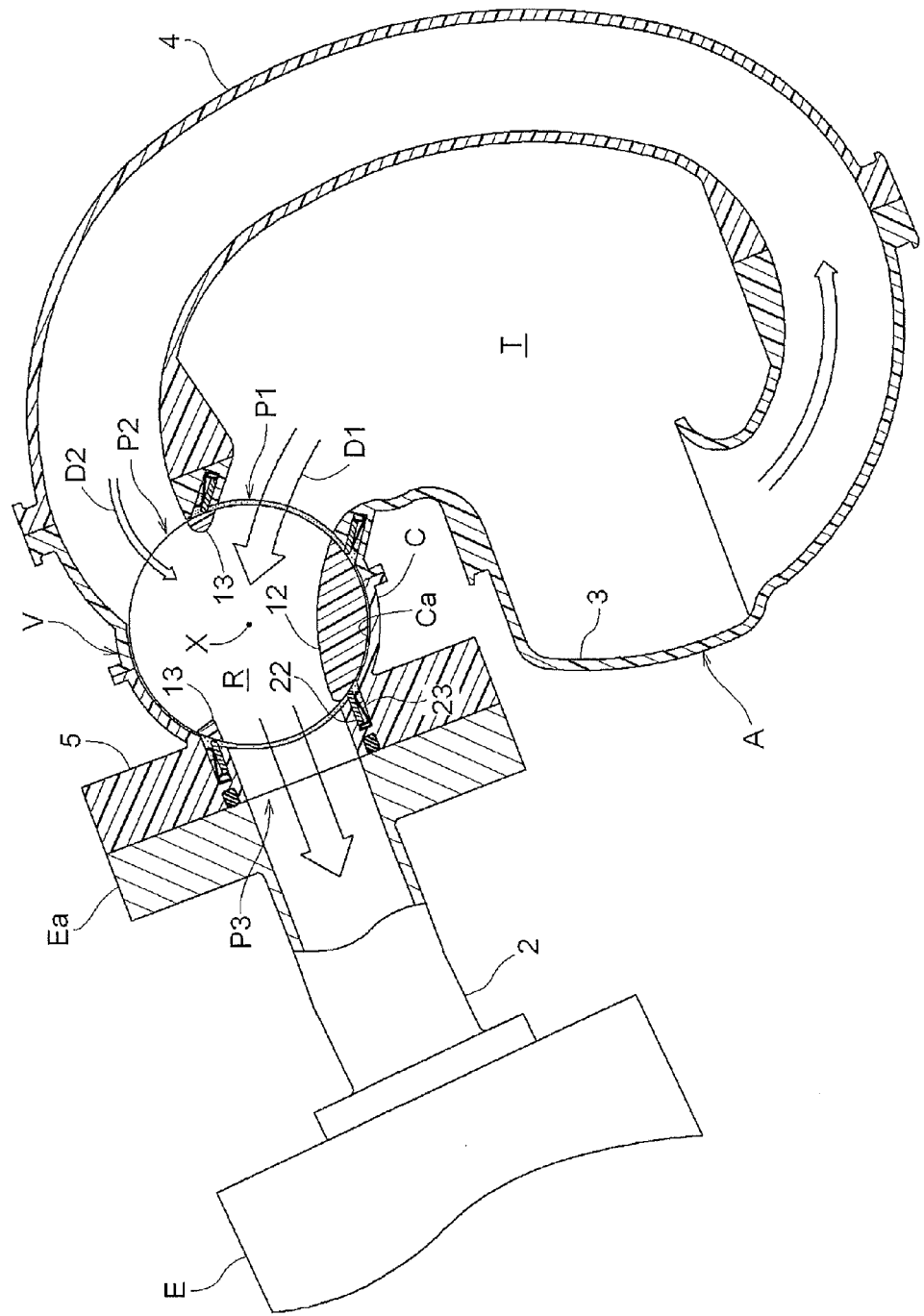
FIG. 1 is a cross section of an air-intake apparatus for an internal combustion engine according to a first embodiment.
Figure 2:
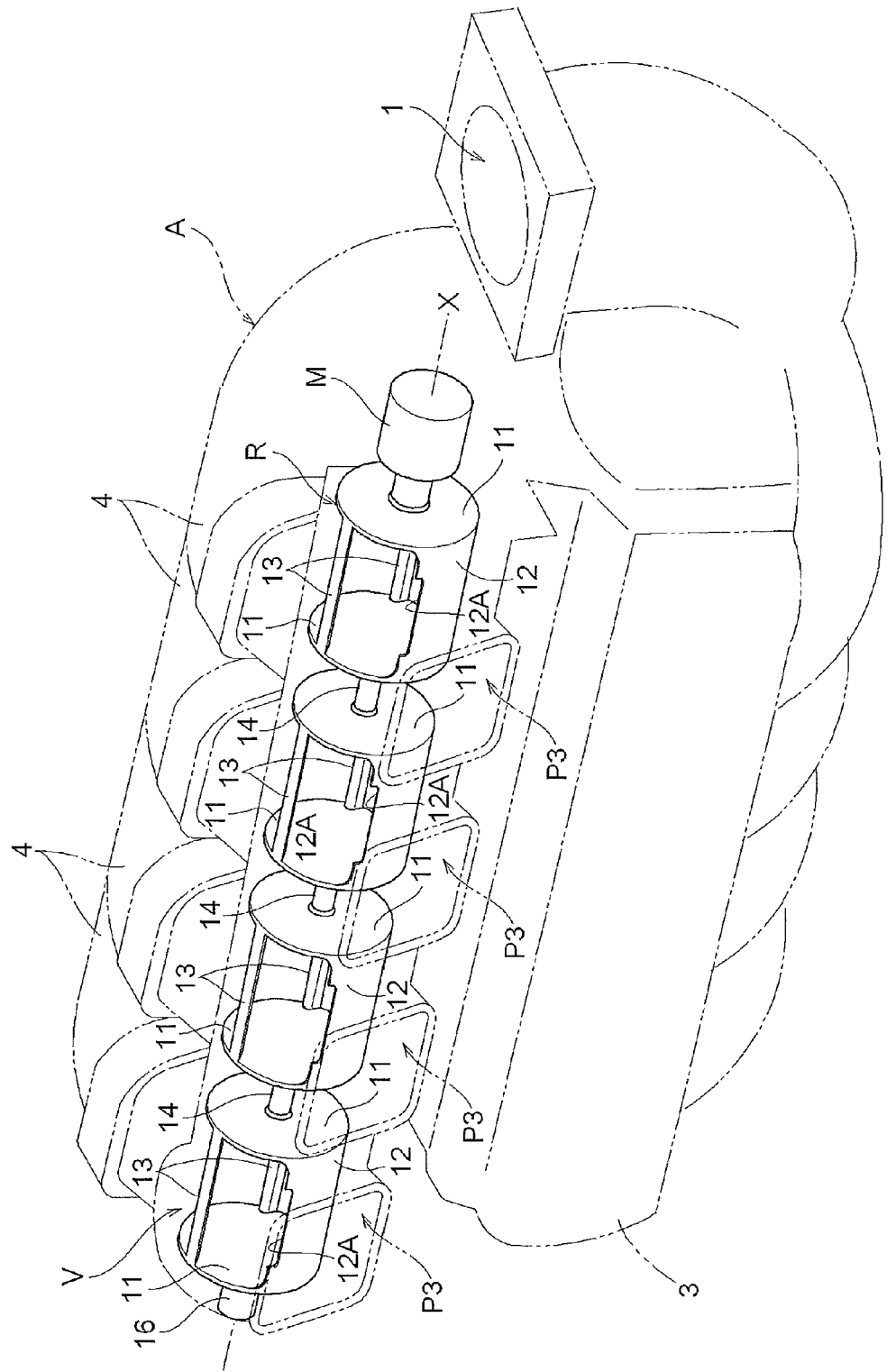
FIG. 2 is a perspective view showing the construction of the air-intake apparatus for an internal combustion engine according to the first embodiment.

As shown in FIGS. 1 and 2, an air-intake apparatus for an internal combustion engine (referred to as "air-intake apparatus" hereinafter) comprises a main body A including a surge tank T having an air accumulation space, a first air-intake passage D1 communicating with the surge tank T, and a second air-intake passage D2 communicating with the surge tank T that is longer than the first air-intake passage D1. In an upper portion of the main body A is provided a rotary valve V for controlling air intake from the first air-intake passage D1 and second air-intake passage D2 to supply the air to an air-intake portion Ea of an engine E (internal combustion engine). It should be noted that the air-intake portion Ea is connected to a cylinder head of the engine E through an air-intake tube 2, and a fuel-jet nozzle (not shown) is provided in a lower portion of the air-intake tube 2.

A hollow tank wall 3 constituting the surge tank T is formed by connecting a molded product made of resin by welding, and an intake inlet 1 is formed in an external portion of the tank wall 3. Ambient air is taken in to the intake inlet 1 through an air cleaner and a throttle (not shown). The first air-intake passage D1 is defined by a cylindrical space in an upper portion of the tank wall 3 while the second air-intake passage D2 is defined by a tubular portion 4 integrally formed with an external surface of the tank wall 3. A flange 5 is formed downstream of an air-intake direction of the rotary valve V to be connected to the air-intake portion Ea. The rotary valve V has a construction in which a rotor R is inserted in a valve casing portion Ca of a tubular casing C to be rotatable about a rotational axis X.

An air-intake control system is formed for controlling air directed to the air-intake portion Ea by setting of a rotating posture of the rotor R. The rotating posture of the rotor R is determined by an air-intake control unit (not shown) including an ECU, for example, thereby allow the rotor R to control air directed to the air-intake portion Ea.

As described above, the rotary valve V is arranged in the upper position of the surge tank T, and the first air-intake passage D1 defines a path direction to produce an air-intake flow directed obliquely upward toward the rotary valve V. The second air-intake passage D2 has a path having an overall arc shape to surround an outward portion of the surge tank T and defines a path direction at a terminal portion thereof to produce an air-intake flow directed obliquely downward toward the rotary valve V. Further, a path direction is defined from the rotary valve V to the air-intake portion Ea to produce an air-intake flow directed generally horizontally.

A length, inner diameter and angle to direct air to the air-intake portion Ea of the second air-intake passage D2 are set to values so that an inertia supercharging effect of air intake is achieved most effectively when the engine E is rotated in mid speed.

The casing C of the rotary valve V forms a first port P1 connected to the first air-intake passage D1, a second port P2 connected to the second air-intake passage D2, and an outlet port P3 connected to the air-intake portion Ea.

As shown in FIGS. 1 to 5, the rotor R includes a plurality of partition walls 11 each having a disk shape centered around the rotational axis X, a wall-like valve portion 12 formed between the pair of partition walls 11, two rib-like members 13 formed between the pair of partition walls 11, and a shaft member 14, all of which are integrally formed as a unit by resin molding. The shaft member 14 may be integral with the unit using metal. Each of the partition walls 11 has an outer diameter slightly smaller than an inner diameter of the valve casing portion Ca of the casing C.

The pair of partition walls 11 forming the valve portion 12 functions to control an air-intake flow toward the rotational axis X. A space between opposing surfaces of the pair of partition walls 11 is slightly larger than a width of each port in a direction along the rotational axis X. The valve portion 12 functions to control air intake by the rotating posture of the rotor R about the rotational axis X. The rib-like members 13 function to reinforce the rotor R and maintain the pair of partition walls 1 parallel to each other to prevent deformation of the rotor caused by twist of the partition walls 11.

The shaft member 14 is arranged coaxially with the rotational axis X to function to rotatably support the rotor R relative to the casing C and connect adjacent partition walls 11 to each other. The shaft members 14 arranged at outer ends of the rotor project outwardly from the partition walls 11. An output shaft of an electric motor M acting as an actuator is connected to an outer end of one of the shaft members 14 while an angle sensor 16 such as a rotary encoder or the like is connected to an outer end of the other of the shaft members 14. The air-intake control unit controls rotation of the electric motor M either in a normal direction or reverse direction with a detected signal from the angle sensor 16 being fed back to the air-intake control unit, as a result of which the rotor R is set to a target rotating position.

Figure 6:
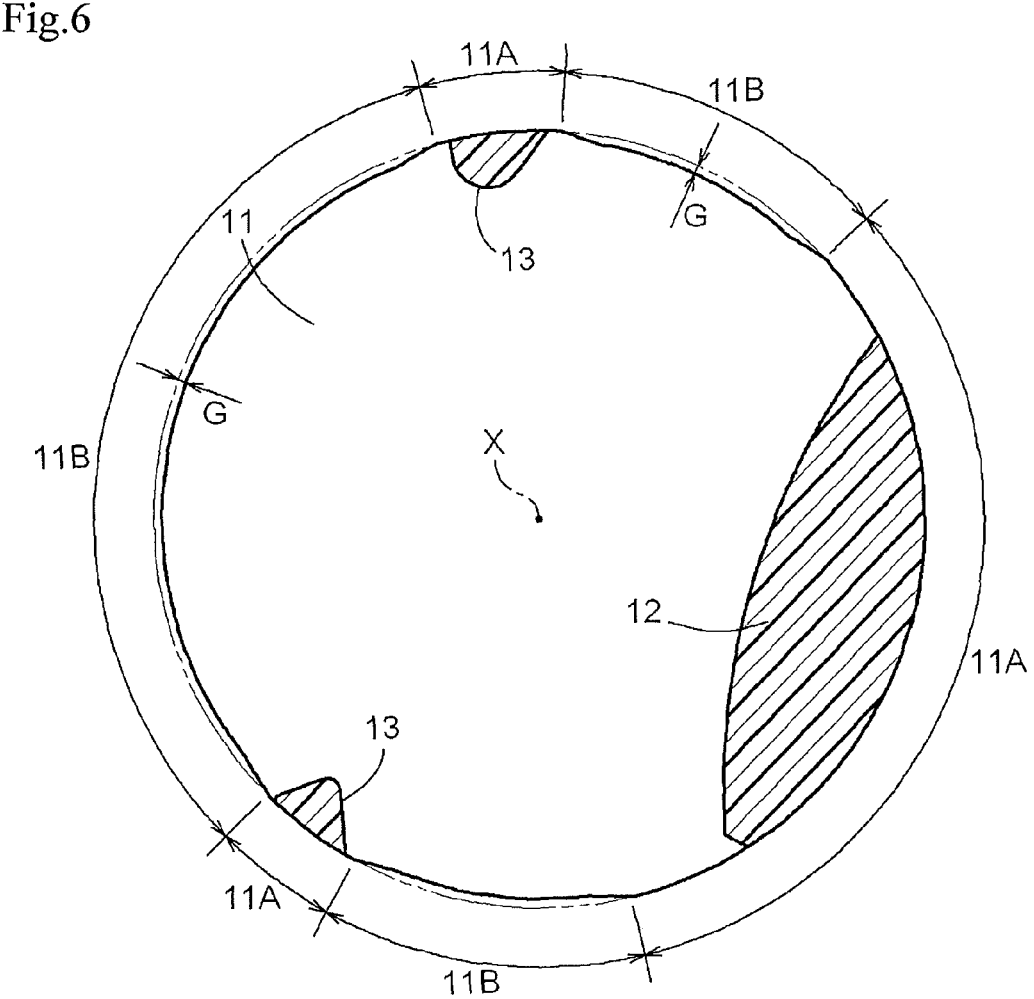
FIG. 6 shows the shape of an outer circumferential edge of a partition wall.

Each of the partition walls 11 is formed generally as a circle centered around the rotational axis X. In this, as shown in FIG. 6, a portion of an outer circumferential edge (outer circumferential surface) of the partition wall 11 where the valve portion 12 or the rib-like member 13 is formed is defined as a reference area 11A. A portion of the outer circumferential edge other than the reference area 11A is defined as a smaller-diameter area 11B having a radius smaller than a radius of the reference area 11A by a predetermined value G. Although the predetermined value G is quite small, sliding resistance between a first seal 22 and a second seal 25 is reduced when the rotor R is rotated by providing the smaller-diameter area 11B.

As described above, the air-intake apparatus of the present invention is intended for the four-cylinder engine as the internal combustion engine. In the main body A, four sets of first air-intake passage D1 and second air-intake passage D2 are provided along a direction of arranging the cylinders. Similarly, four sets of first port P1, second port P2 and outlet port P3 are provided along the direction of arranging the cylinders. An opening of each of the first port P1, second port P2 and outlet port P3 has a rectangular shape. In each opening, one set of opening edges are defined parallel to the rotational axis X and the other set of opening edges are defined as arcs perpendicular to the rotational axis X.

The rotational axis X is defined in a horizontal direction along the direction of arranging the cylinders, and four sets of the pair of partition walls 11 are arranged in the rotor R of the rotary valve V. Correspondingly, four valve portions 12 and four sets of the pair of rib-like members 13 are provided. In particular, a cut-out portion 12A having a shape as shown in FIG. 2 is formed at one end portion of the valve portion 12. As described later, air intake to the air-intake portion Ea is achieved through the cut-out portion 12A when the engine E is idling.

The amount of air intake is adjustable by opening and closing the throttle valve disposed upstream the surge tank T. The air flows into the surge tank T through the air-intake inlet 1 (see FIG. 2). Since it is effective to control air intake in a position near a combustion chamber, the rotary valve V is arranged in a position to define a short distance to the output port P3.

(Rotary Valve)

The casing C of the rotary valve V has a construction in which the independent valve casing portions Ca corresponding to the number of cylinders of the engine E are arranged along the rotational axis X with adjacent casing portions Ca being connected to each other through a cylindrical portion Cp that is coaxial with the rotational axis X.

Figure 3:
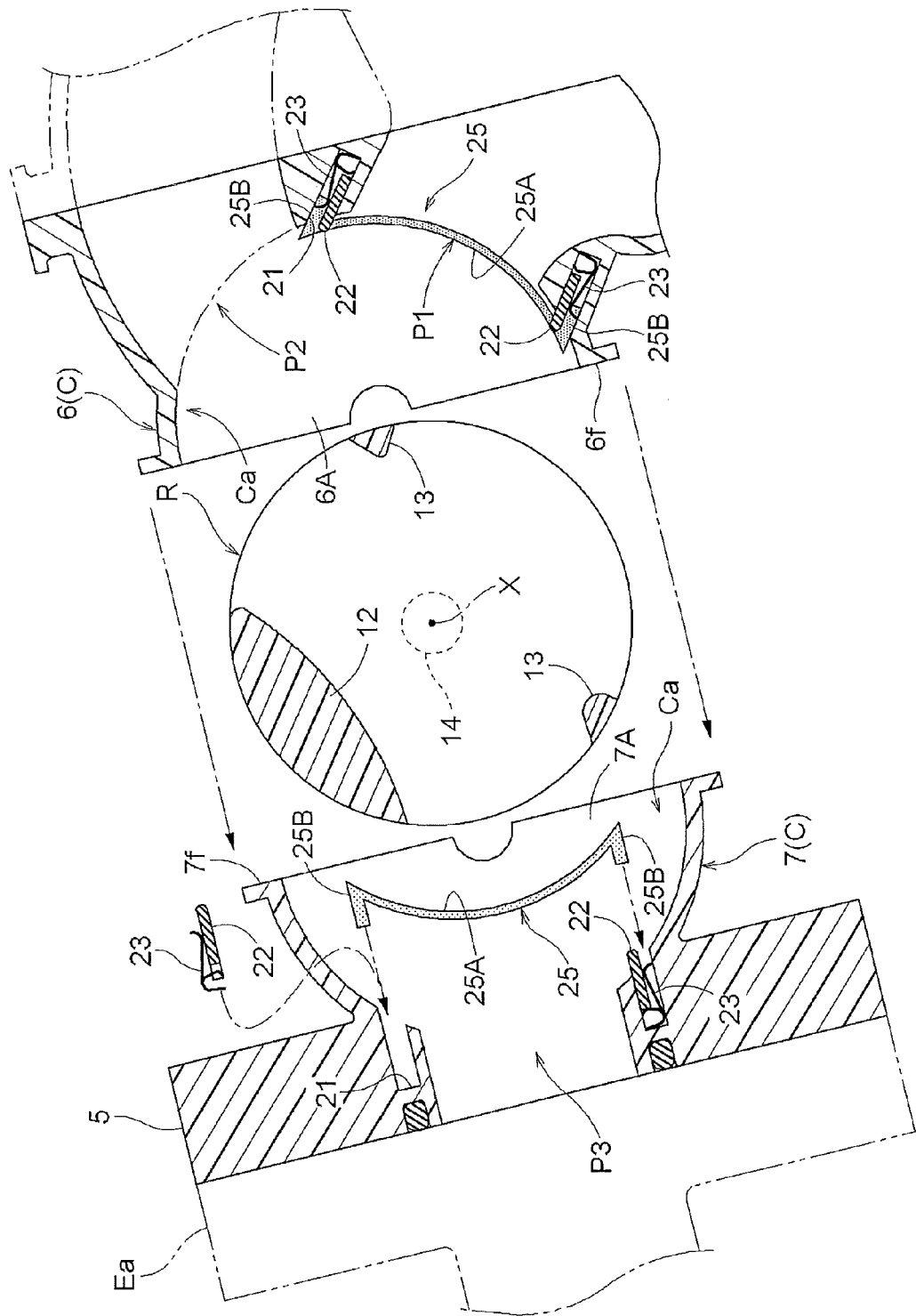
FIG. 3 is a cross section showing a disassembled casing according to the first embodiment.
Figure 4:
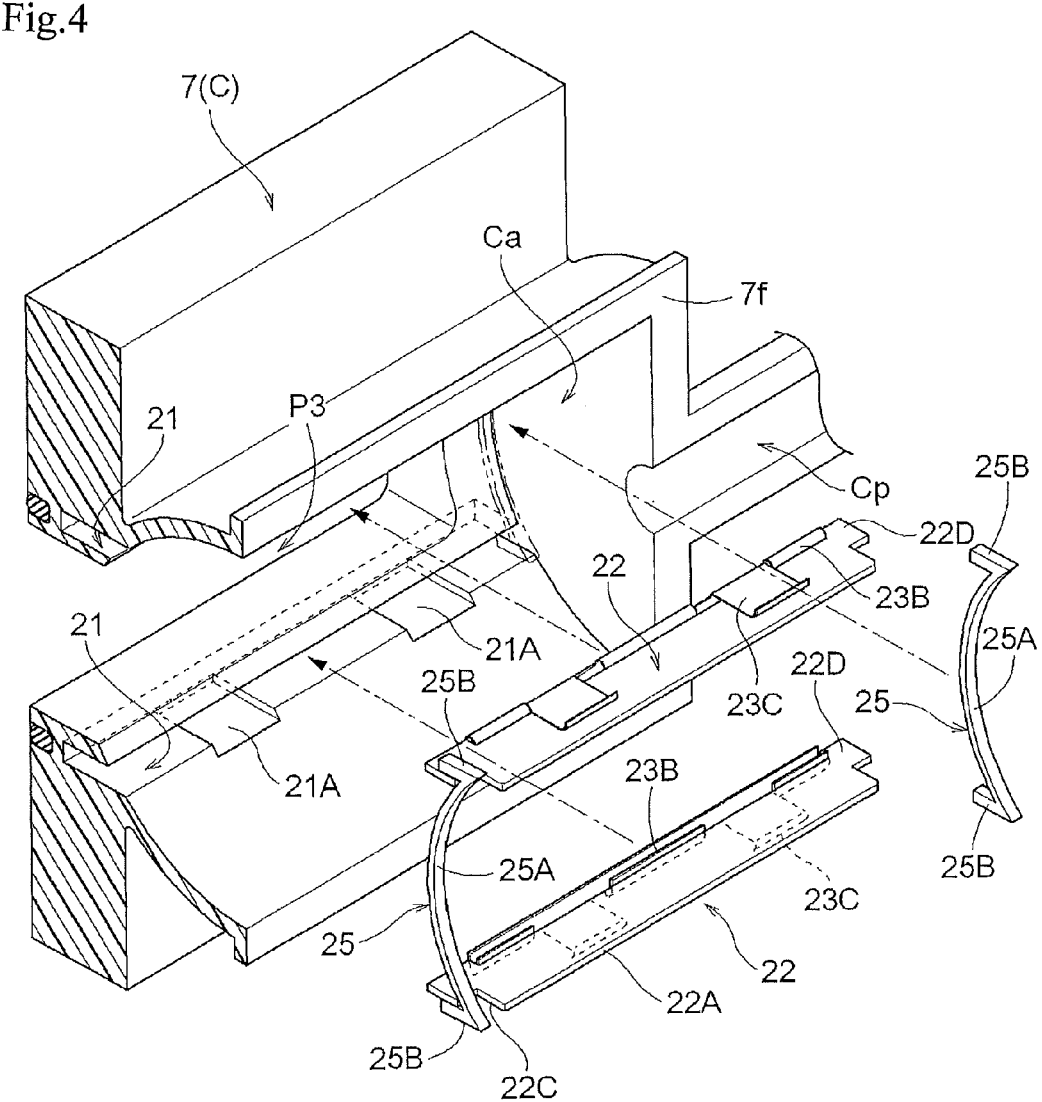
FIG. 4 is an exploded perspective view showing a first seal and a second seal.
Figure 5A:
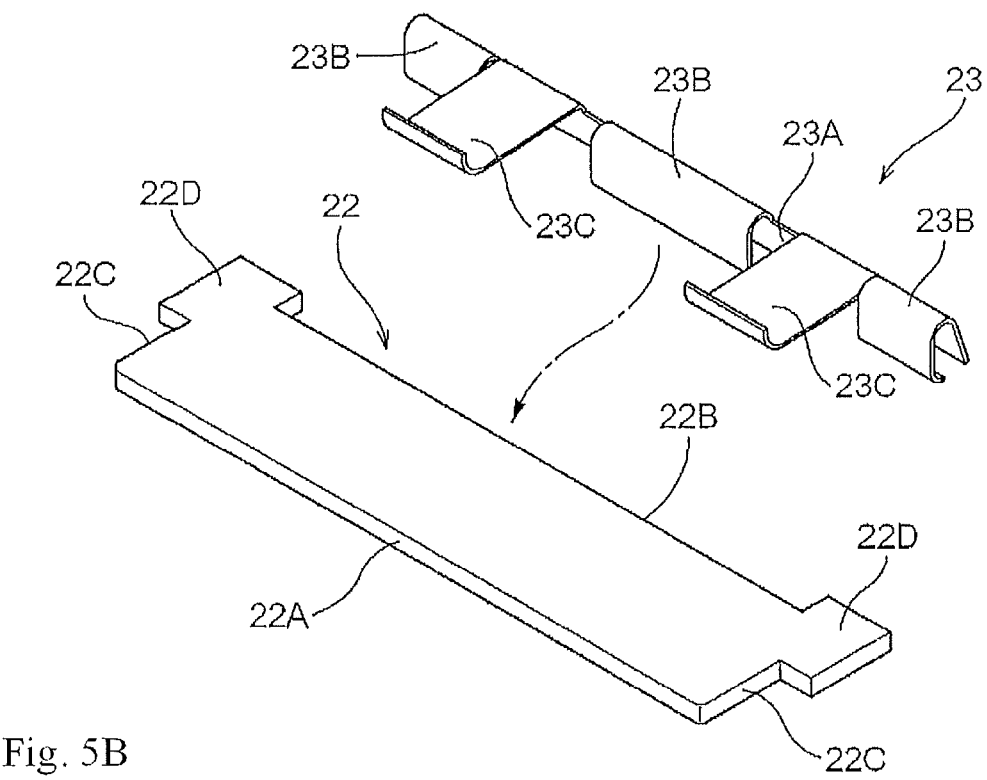
FIG. 5A and FIG. 5B are perspective views showing the first seal and a flat spring.
Figure 5B:
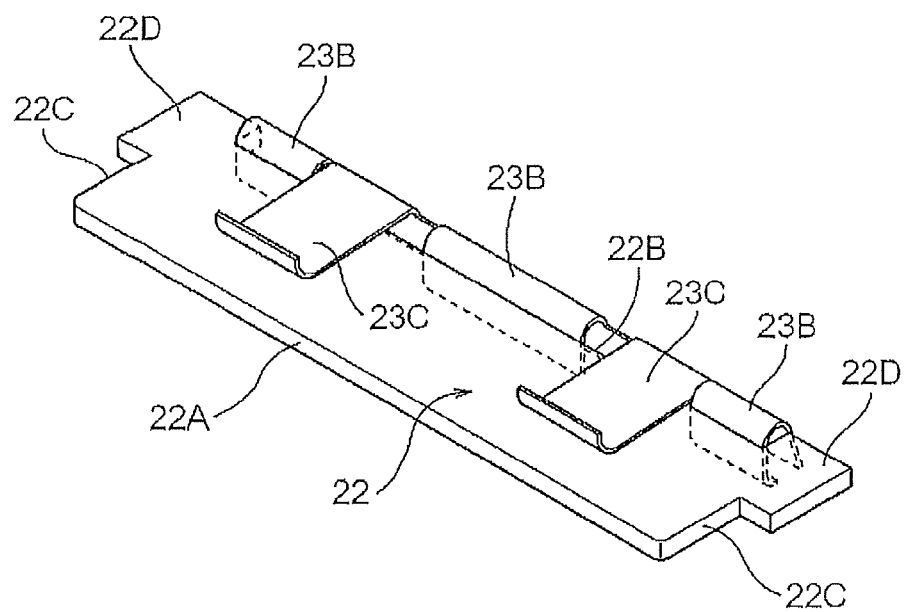

The valve casing portion Ca contacts the cylindrical portion Cp in a radial direction to be connected to each other. As shown in FIG. 3, the valve casing Ca and the cylindrical portion Cp include a first casing 6 made of resin and continuously formed with the tank wall 3 and a second casing 7 made of resin and connected to the flange 5. Dividing wall portions 6A and 7A provided outside of the partition walls 11 are integrally formed with the first casing 6 and the second casing 7, respectively. The first port P1 and the second port P2 are formed in the first casing 6 while the outlet port P3 is formed in the second casing 7. The first casing 6 and the second casing 7 are connected to each other at flange surfaces 6f and 7f by welding.

In the valve casing portion Ca of the valve casing C, a groove 21 is formed in a region parallel to the rotational axis X in the vicinity of the opening of each of the first port P1 and the outlet port P3. A linear first seal 22 is engageably supported to the groove 21. On the other hand, an arc second seal 25 shaped along the valve casing portion Ca is provided in a region perpendicular to the rotational axis X in the vicinity of the opening of each of the first port P1 and the outlet port P3.

The first seal 22 is urged to project toward the direction of the rotational axis X by a flat spring 23 acting as an urging element, and urged to be pressed against one of inner walls of the groove 21. The flat spring 23 is formed from a spring material and integral with a proximal portion 23A, three projecting urging pieces 23B and a pair of pressing urging pieces 23C. The groove 21 has a recessed space 21A corresponding to the shape of the flat spring 23 for receiving each pressing urging piece 23C.

The first seal 22 is made of a resin material that is plate-shaped as a whole and elastically deformable, and includes a narrowed sealing surface 22A at a distal end thereof to extend between the pair of partition walls 11, and a recessed portion 22B at a proximal portion thereof for receiving the flat spring 23. Further, opposite end portions at the distal end of the first seal 22 are partially cut away to form a stepped portion 22C. A guide piece 22D is formed in a position between each stepped portion 22C and the recessed portion 22B.

The second seal 25 is made of a resin material that is arc-shaped and elastically deformable, and includes a sealing surface 25A in an inner periphery thereof to extend along the length of the valve portion 12, and engageable pieces 25B integrally formed with opposite end portions thereof. While the second seal 25 is provided in a position to contact the outer circumferential portion (outer circumferential surface) of the partition wall 11, it may be provided to contact a surface (side face) of the outside of the partition wall 11 (where the valve portion 12 is not provided).

The same types of the first seal 22 and the second seal 25 are used for both of the first port P1 and the outlet port P3.

(Rotary Valve: Assembly)

In assembling the rotary valve, the flat springs 23 and the first seals 22 are fitted into the upper and lower grooves 21 at the first port P1 of the first casing 6 and the outlet port P3 of the second casing 7, and then the pair of engageable pieces 25B of each of the second seals 25 are fitted into end portions of the upper and lower grooves 21. The sealing surface 22A of the first seal 22 and the sealing surface 25A of the second seal 25 project from the inner peripheral surface of the valve casing portion Ca by the same amount. It should be noted that the pressing urging piece 23C is positioned inside the recessed space 21A with the flat spring 23 and the first seal 22 being fitted into the groove 21.

In this way, the rotor R is arranged in a position between the first casing 6 and the second casing 7 with the first seal 22 and the second seal 25 being supported, and the first casing 6 and the second casing 7 are connected to each other by welding at the flange surfaces 6f and 7f. Further, the output shaft of the motor M and the angle sensor 16 are connected to the outer end portions of the shaft members 14.

In the rotary valve V assembled in this way, the pair of partition walls 11, the valve portion 12 and the rib-like members 13 for the rotor R are housed in each of the four valve casing portions Ca, and the shaft member 14 for the rotor R is housed in the cylindrical portion Cp.

In particular, in the assembled rotary valve V, an outer end portion of the guide piece 22D of the first seal 22 comes into contact with an end portion of the groove 21, thereby to limit movement of the first seal 22 in a longitudinal direction of the groove 21. Further, an urging force of the pressing urging pieces 23C of the flat spring 23 establishes a state in which the first seal 22 comes into tight contact with an inner surface of the groove 21 adjacent the port. In addition, the engageable piece 25B of the second seal 25 is provided to come into contact with the first seal 22 between the stepped portion 22C and the guide piece 22D, thereby to limit displacement of the second seal 25 toward the opening of the port. The second seal 25 is brought into contact with the dividing wall portions 6A or 7A, thereby to limit displacement of the second seal 25 toward the opposite direction of the opening of the port.

When the rotor R is rotated to bring the valve portion 12 to the position of the first port P1, the first seals 22 are brought into contact with the regions extending along the rotational axis X at opposite end positions (upper and lower positions in FIG. 10) in the circumferential direction of the valve portion 12, while the second seals 25 are brought into contact with the reference areas 11A of the outer circumferences of the partition walls 11. In particular, the upper first seal 22 comes into contact with a region of the valve portion 12 where the cut-out portion 12A is not provided to establish a state in which the first port P1 is closed with the valve portion 12.

Similarly, when the rotor R is rotated to bring the valve portion 12 to the position of the outlet port P3, the outlet port P3 may be closed with the valve portion 12 in the same manner as the first port P1, but is actually not completely closed as described later. More particularly, in the outlet port P3, as shown in FIG. 7, the positional relationship is maintained for allowing air intake to the outlet port P3 through the cut-out portion 12A of the valve portion 12 while the lower first seal 22 serves to completely shut off the air flow.

(Setting of Rotating Posture of Rotor)

Figure 7:
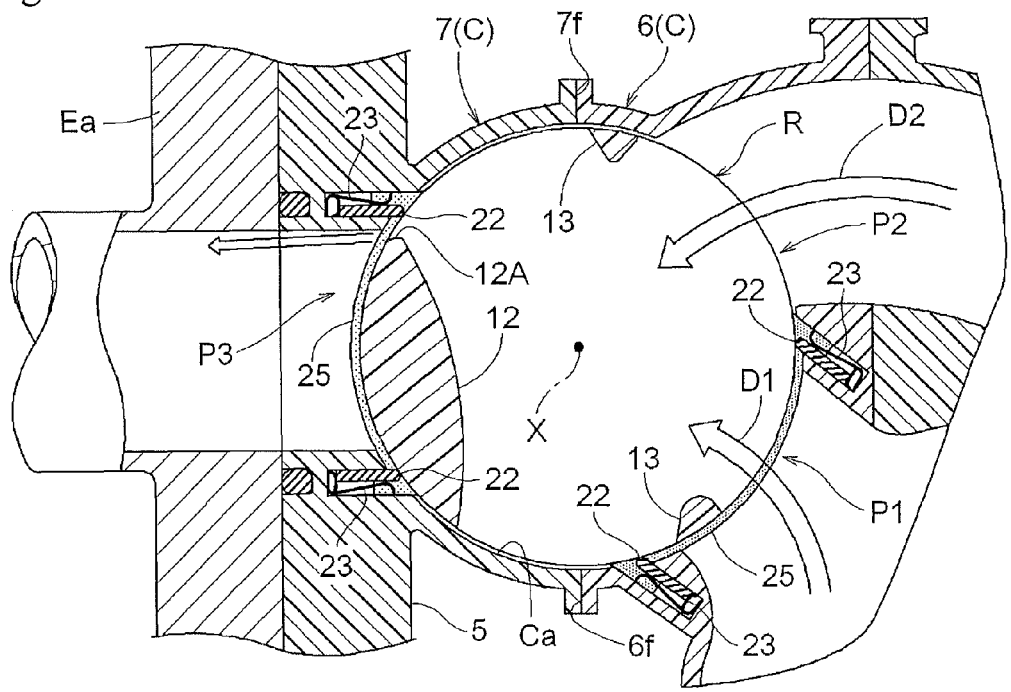
FIG. 7 is a cross section showing a rotating posture of a rotor in an idling state.

In this air-intake apparatus, when the rotating posture of the rotor R is set as shown in FIG. 7 in idling of the engine, the valve portion 12 is brought to a position for allowing air intake through the cut-out portion 12A while most of the opening of the outlet port P3 is closed with the valve portion 12. As a result, a small amount of air is taken in through the cut-out portion 12A relatively at high speed in an upper region of the outlet port P3 since the cut-out portion 12A is shaped as a slit, which promotes mixing of air and fuel to achieve satisfactory combustion.

When the engine is idling, the rotor R may vibrate in a direction to project or retract the first seal 22 from the groove 21 inside the valve casing portion Ca due to vibration caused by the engine E. Even when such vibration is produced, since the first seal 22 is urged toward the projecting direction by the projecting urging piece 23B of the flat spring 23, no large gap is defined between the sealing surface 22A of the first seal 22 and the valve portion 12 of the rotor R. Thus, the lower first seal 22 is maintained in a tight contact condition with the valve portion 12, and occurrence of an unusual sound due to contact between the rotor R and the valve casing portion Ca of the casing C is restrained.

Further, since the pair of first seals 22 provided in each of the first port P1 and the outlet port P3 are urged by the pressing urging pieces 23C of the flat spring 23 in the direction to tight contact the inner surfaces of the grooves 21 adjacent the ports, no air leakage occurs in positions of the grooves 21 close to the openings of the ports.

Figure 8:
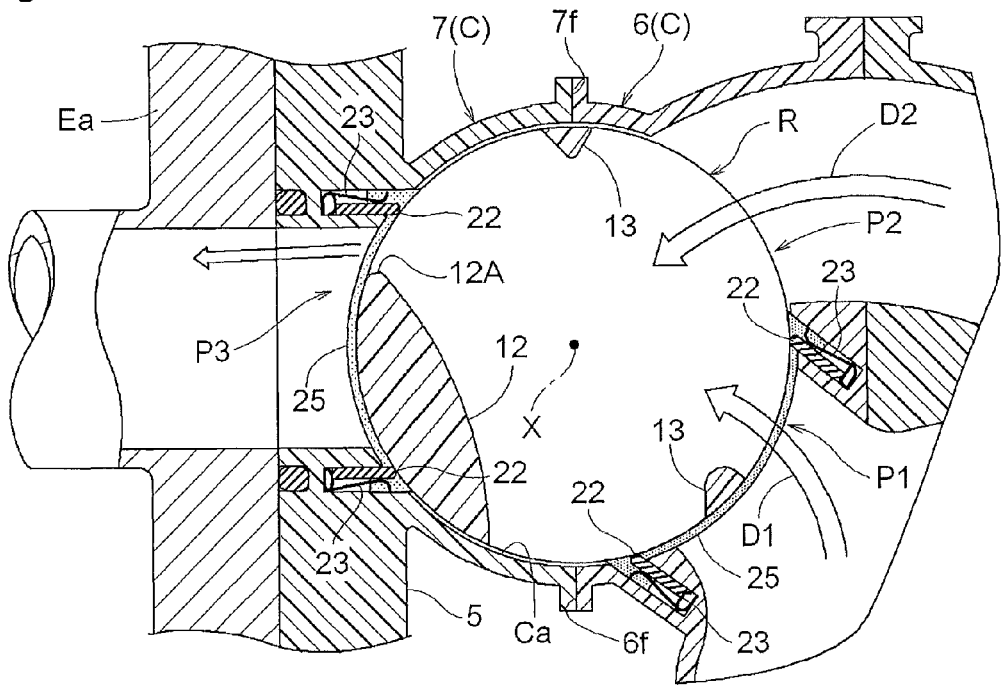
FIG. 8 is a cross section showing a rotating posture of the rotor in a super-slow-speed rotation state.

When the engine is rotated at super-slow speed, the rotor R is set to a rotating posture as shown in FIG. 8, thereby to close a large part of the outlet port P3 with the valve portion 12. The valve portion 12 is positioned to allow an upper end thereof to be displaced slightly below relative to the outlet port P3. As a result, the air is supplied to the combustion chamber of the engine E through the space above the valve portion 12. When the air is taken in, a tumbling flow is produced within the cylinders of the engine E to promote mixing of the air and the fuel supplied from the fuel-jet nozzle and achieve satisfactory combustion.

Figure 9:
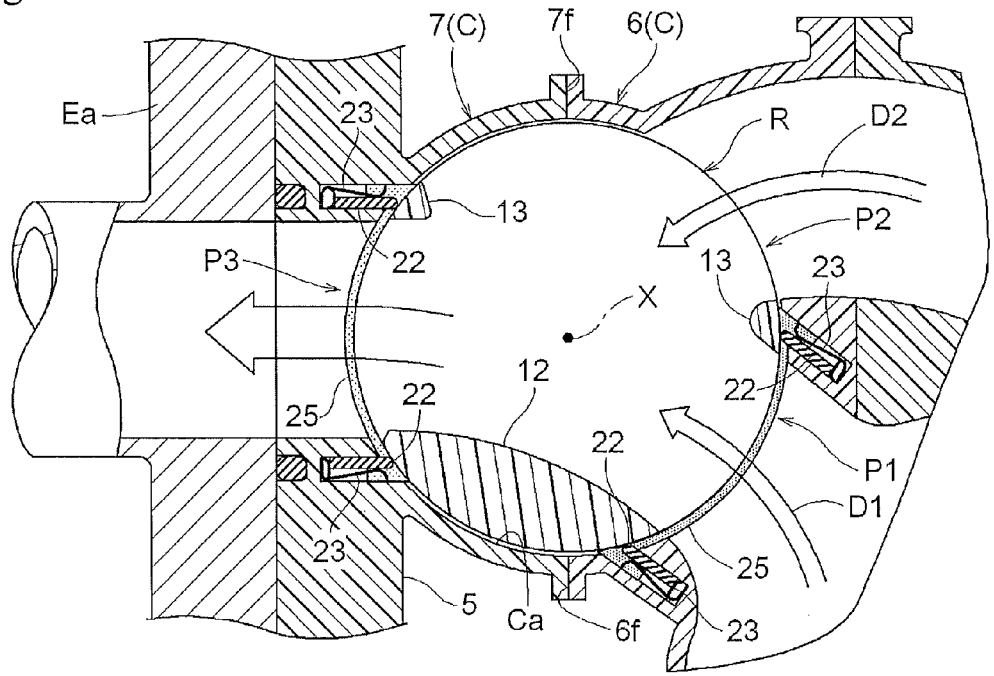
FIG. 9 is a cross section showing a rotating posture of the rotor in a low-speed rotation state and a high-speed rotation state.

When the engine is rotated at low speed, the rotor R is set to a rotating posture as shown in FIG. 9, thereby to arrange the valve portion 12 in a position so as not to interfere with any of the ports. As a result, the air from both of the first port P1 and the second port P2 is supplied to the air-intake portion Ea.

Figure 10:
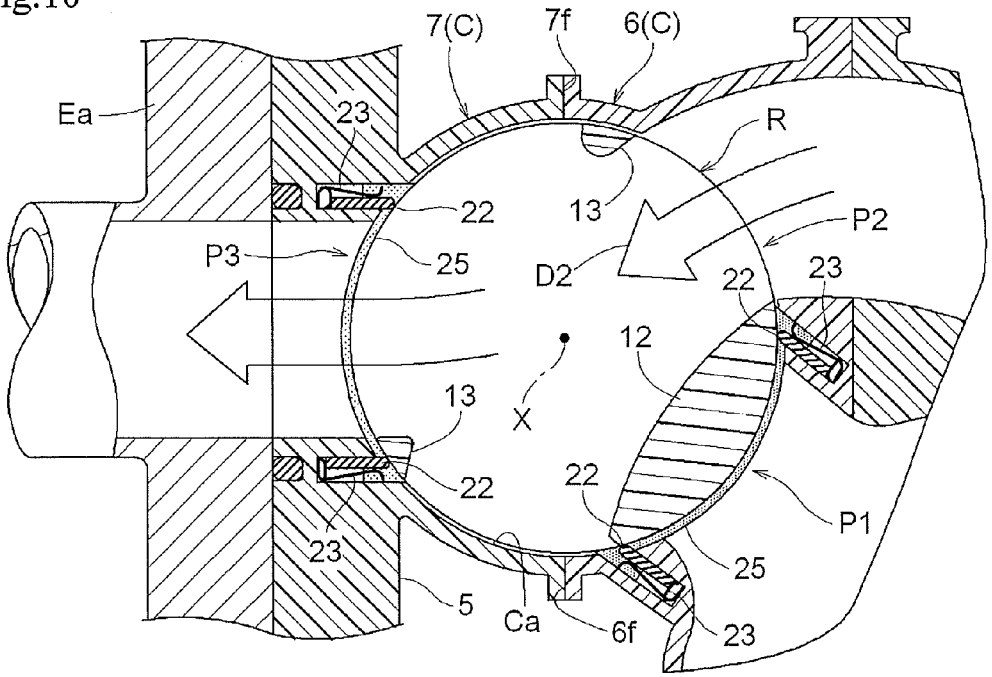
FIG. 10 is a cross section showing a rotating posture of the rotor in a mid-speed rotation state.

When the engine is rotated at mid speed, the rotor R is set to a rotating posture as shown in FIG. 10, thereby to arrange the valve portion 12 in a position to close the first port P1. As a result, the air from the second port P2 is linearly supplied to the combustion chamber. In the rotation in mid speed, air intake is performed along a linear passage to produce the inertia supercharging effect using dynamic inertia of air most effectively In order to achieve such an inertia supercharging effect, it is important to guide the air from the second port P2 to the outlet port P3 without creating turbulence and it is required to close the first port P1 in a tight seal condition. Thus, the sealing surfaces 22A of the upper and lower first seals 22 and the sealing surfaces 25A of the pair of second seals 25 come into contact with the valve portion 12. When such a contacting condition is maintained, air leakage from the first port P1 is prevented to produce the satisfactory inertia supercharging effect only by air intake from the second port P2.

When the engine is rotated at high speed, in the same manner as rotated at low speed, the rotor R is set to a rotating posture as shown in FIG. 9, thereby to arrange the valve portion 12 in a position so as not to interfere with any of the ports. As a result, the air from both of the first port P1 and the second port P2 is supplied to the air-intake portion Ea.

The above control is achieved by the air-intake control unit that controls the electric motor M based on the rotation rate of the engine. This air-intake control unit allows the rotor R to make normal rotation (counterclockwise rotation in FIG. 7) when the engine is shifted from the idling state to the super-slow-speed rotation state, and shifted from the super-slow-speed rotation state to the low-speed rotation state, and shifted from the low-speed rotation state to the mid-speed rotation state. When the engine is shifted from the mid-speed rotation state to the high-speed rotation state, the air-intake control unit allows the rotor R to make reverse rotation (clockwise rotation in FIG. 7).

SECOND EMBODIMENT

Overall Construction

In the second embodiment, the construction of the main body A including the surge tank T, first air-intake passage D1, second air-intake passage D2 is the same as in the first embodiment, and the construction of the rotary valve V is different from the first embodiment. The same reference numbers or signs as in the first embodiment are assigned to the elements having the same functions as in the first embodiment.

Figure 11:
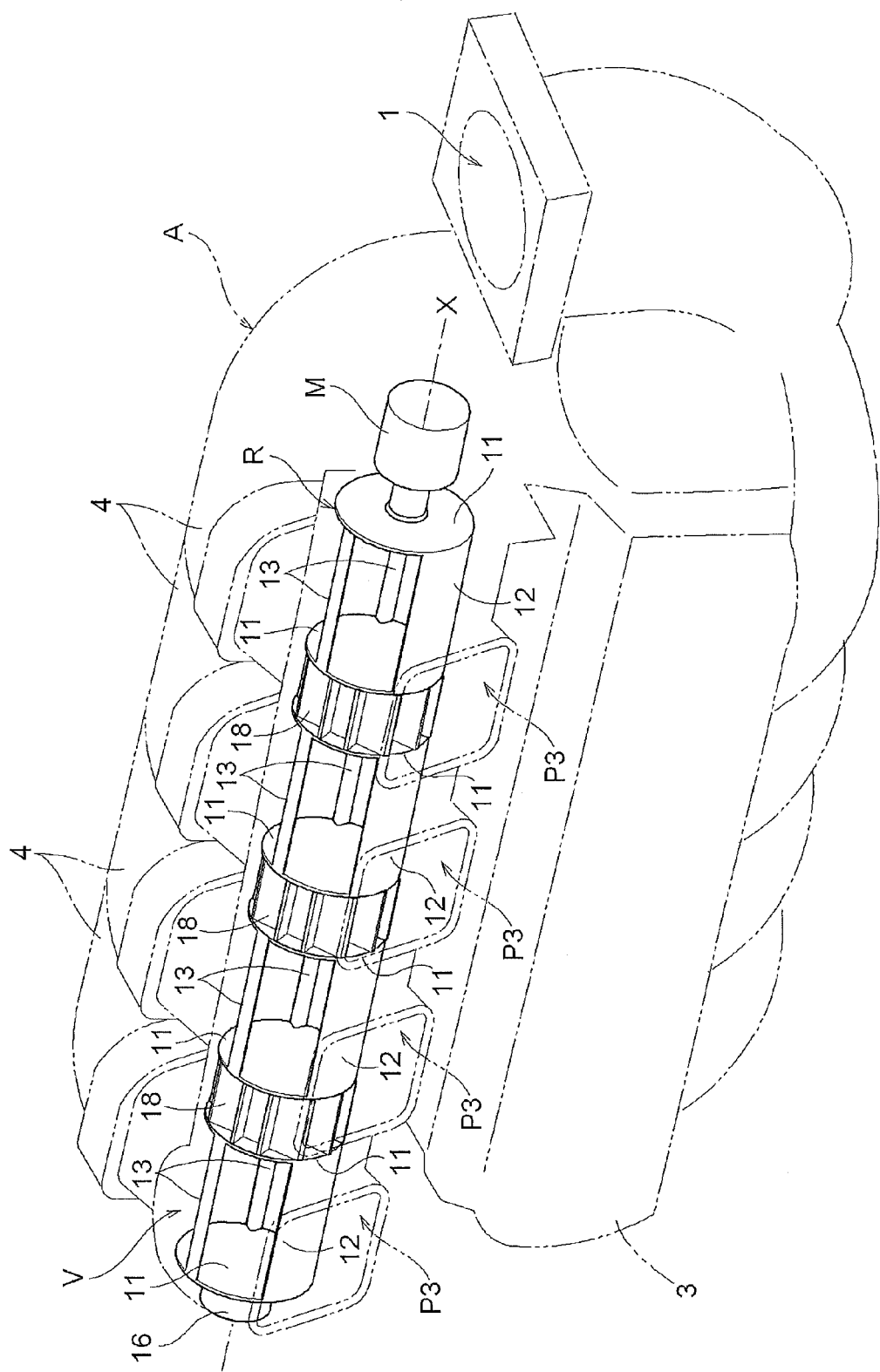
FIG. 11 is a perspective view showing the construction of the air-intake apparatus for an internal combustion engine according to a second embodiment.
Figure 12:
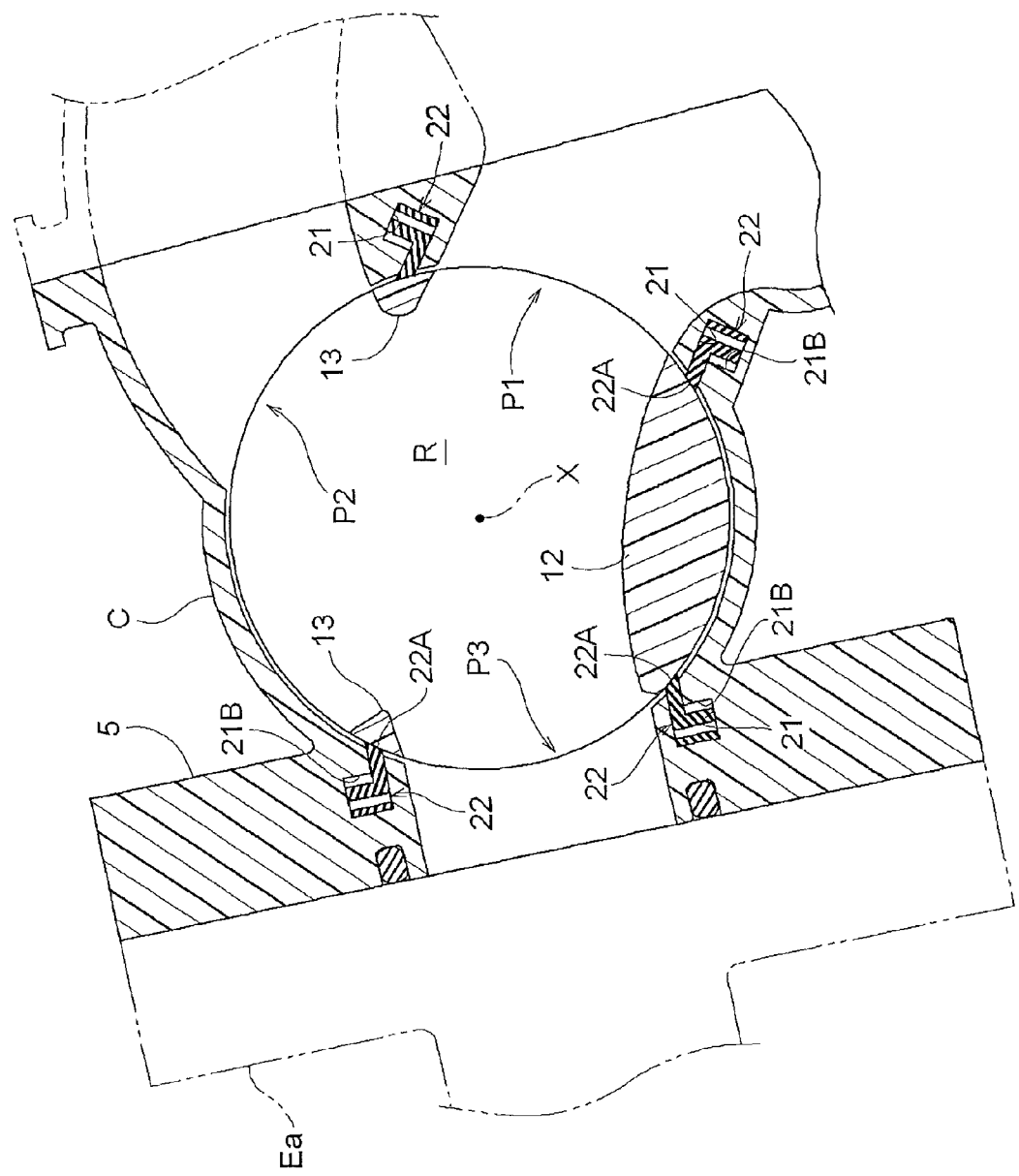
FIG. 12 is a cross section showing a portion of the casing according to the second embodiment.
Figure 13:
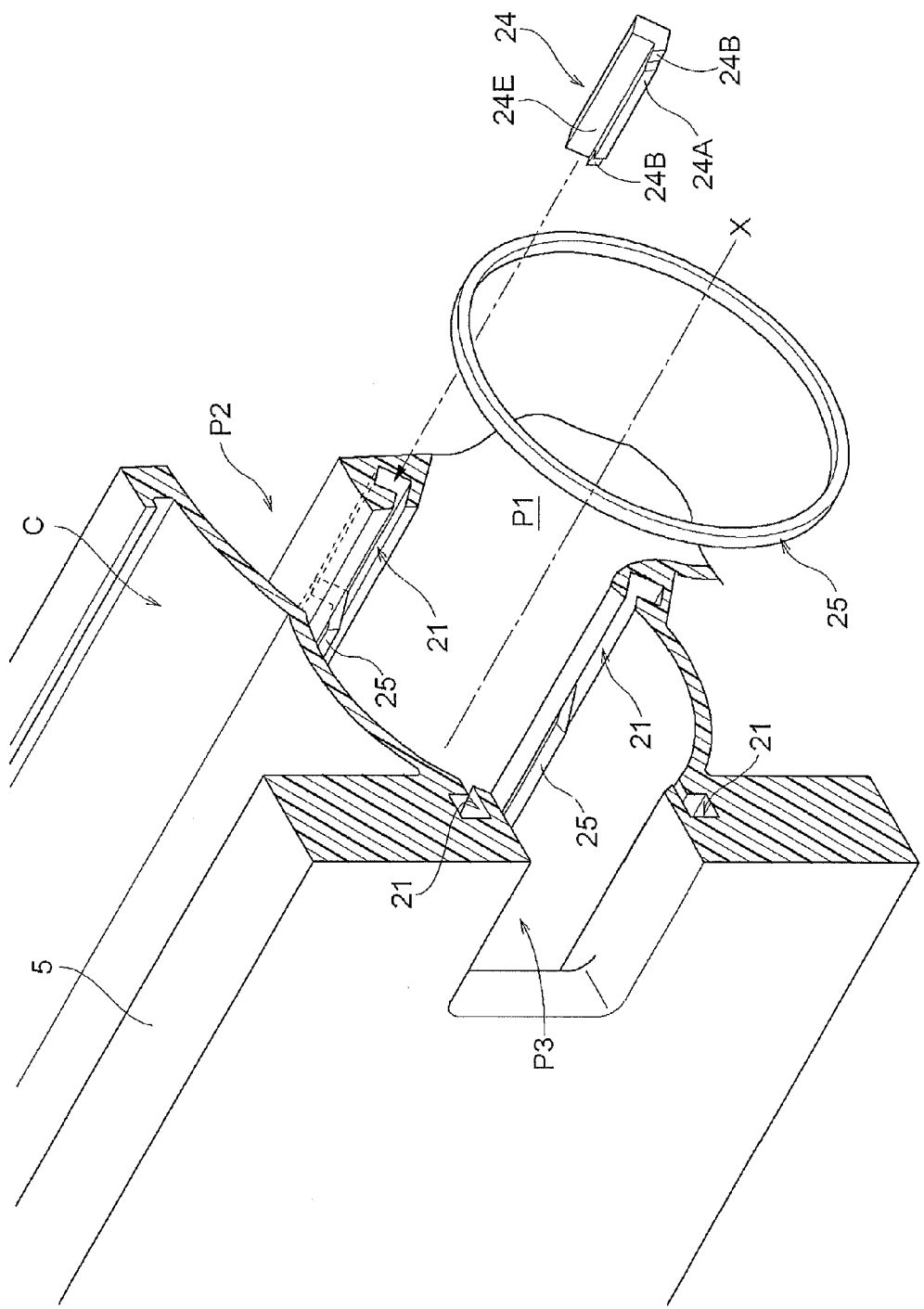
FIG. 13 is a perspective view showing the arrangement of the first seal and other elements according to the second embodiment.
Figure 14:
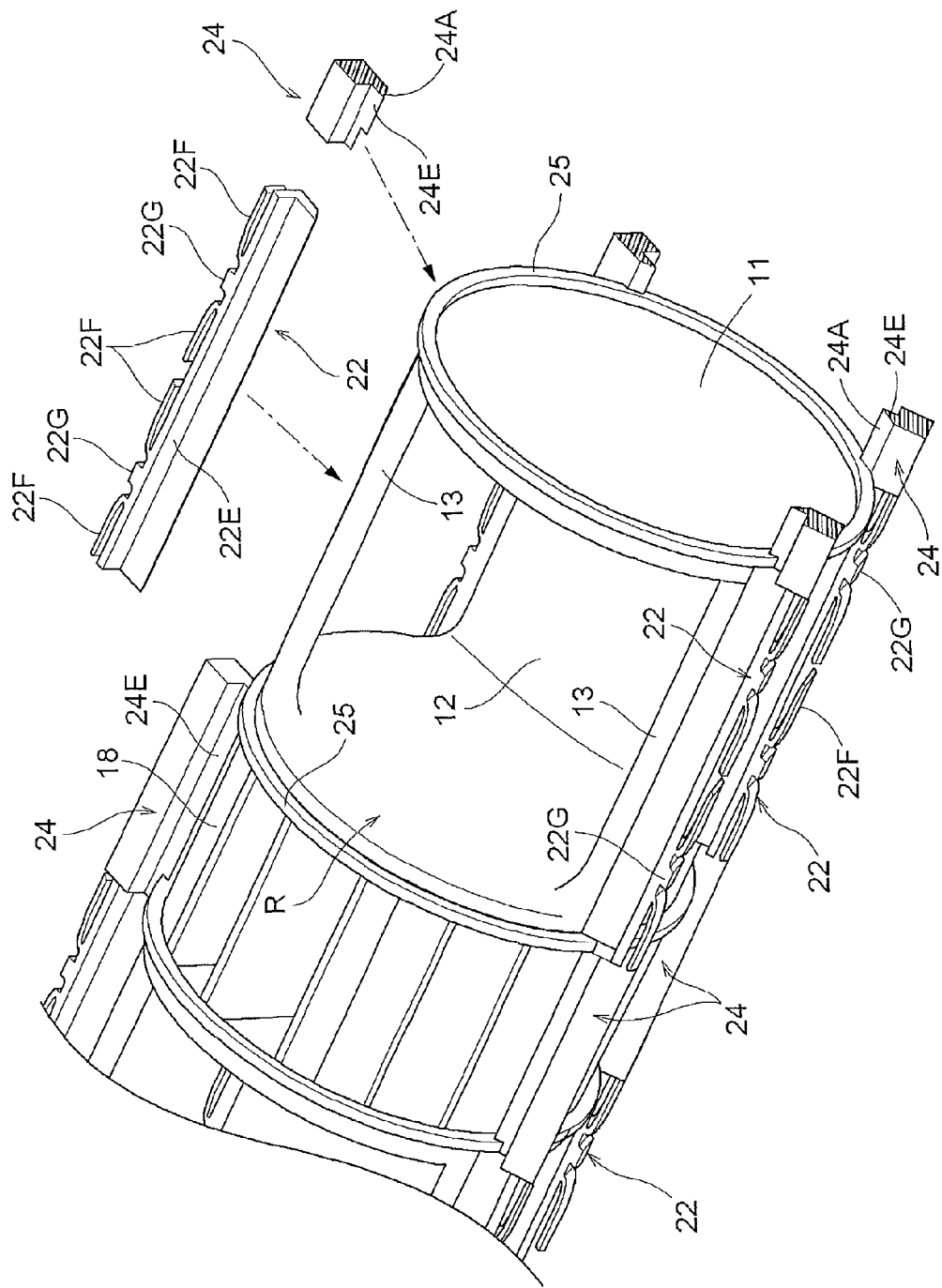
FIG. 14 is an exploded perspective view showing the arrangement of the first seal and other elements according to the second embodiment.
Figure 15:
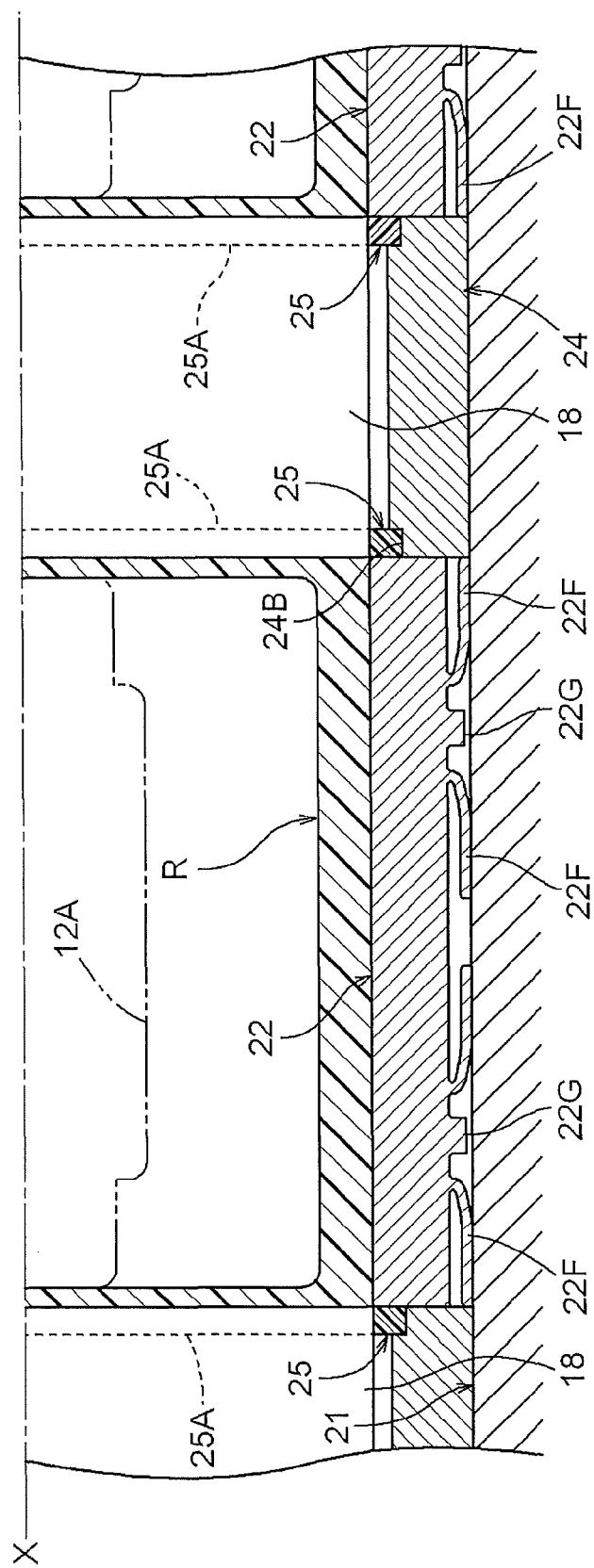
FIG. 15 is a cross section showing the arrangement of the first seal and second seal.
Figure 16:
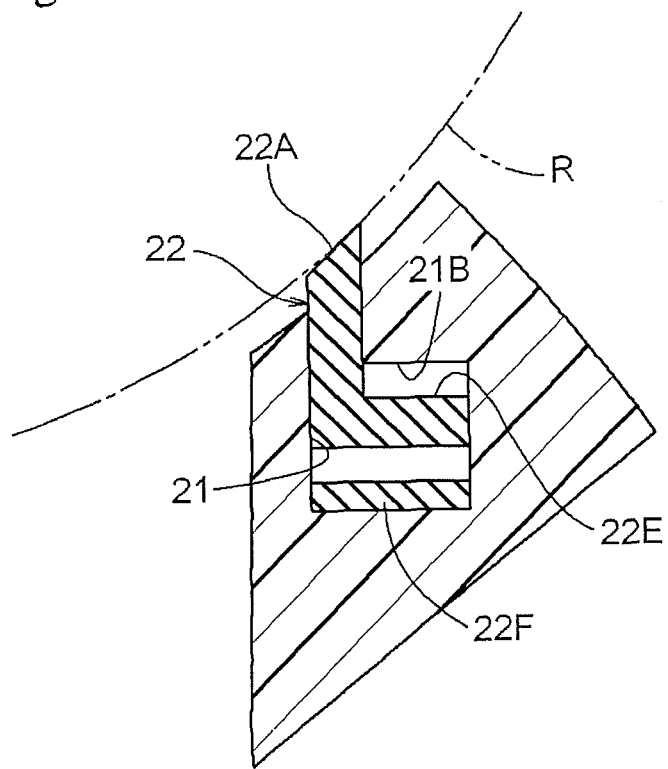
FIG. 16 is a cross section of the first seal supported to a groove.
Figure 17:
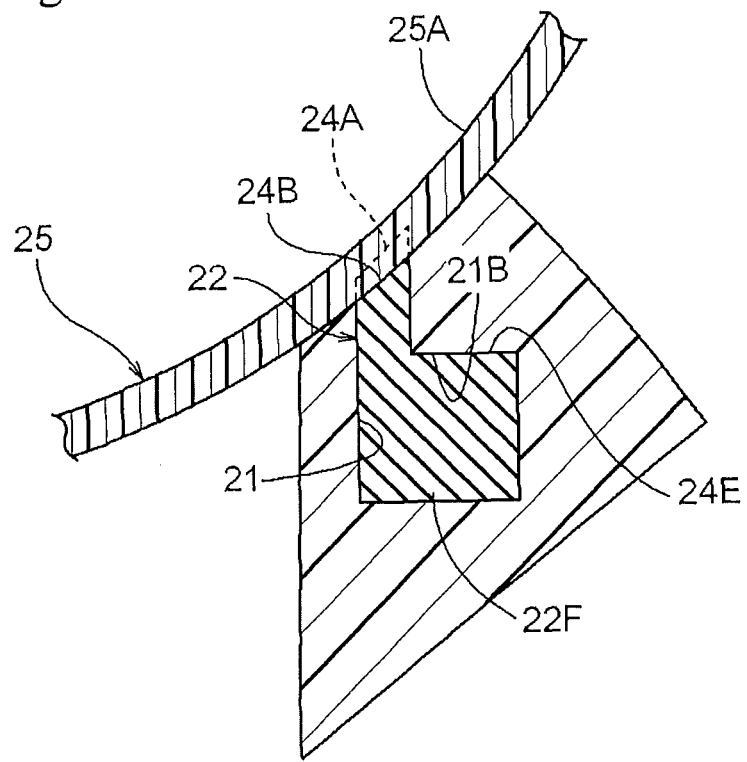
FIG. 17 is a cross section of a spacer supported to the groove.
Figure 18:
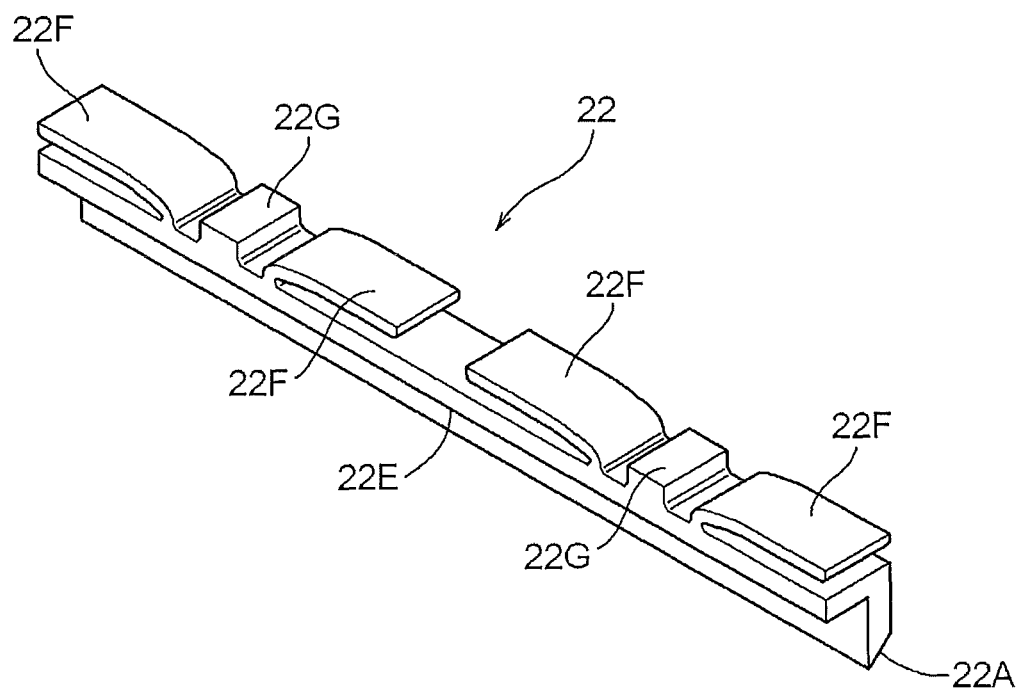
FIG. 18 is a perspective view showing the shape of the first seal.
Figure 19:
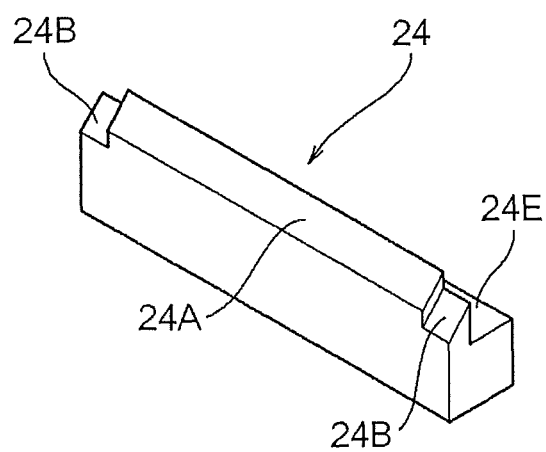
FIG. 19 is a perspective view showing the shape of the spacer.

As shown in FIGS. 11 and 12, the rotary valve V includes the rotor R rotatable about the rotational axis X relative to the casing C as in the first embodiment. In the second embodiment, the casing C has a simple tubular shape, and the rotor R also has a cylindrical shape as a whole without having the shaft members 14 provided in the first embodiment.

More particularly, the casing C includes the first port P1 connected to the first air-intake passage D1, second port P2 connected to the second air-intake passage D2, and outlet port P3 connected to the air-intake portion Ea. The rotor R includes, as one set, a pair of disk-like partition walls 11, valve portion 12, and two rib-like members 13. The number of sets of those members corresponding to the number of cylinders is provided, that is, four sets of those elements are provided. Adjacent partition walls 11 are connected by a connecting portion 18. The connecting portion 18 includes a plurality of plate-like members to connect the adjacent partition walls 11 to each other to achieve rigid connection while reducing weight.

It should be noted that the above-noted rotor R also has the reference area 11A and the smaller-diameter area 11B with a smaller diameter than the radius of the reference area 11A, which are formed as the outer circumferential edge of the partition wall 11.

As shown in FIGS. 11 to 19, the rotary valve V includes a plurality of grooves 21 corresponding to the portion of the first port P1 and the outlet port P3, which are formed parallel with the valve casing portion Ca of the casing C along the rotational axis X. The first seal 22 and a spacer 24 are inserted into each groove, in which the first seal 22 is positioned in a portion where the port is provided while the spacer 24 is positioned in a portion where the port is not provided. The annular second seal 25 centered around the rotational axis X is provided in a boundary between the first seal 22 and the spacer 24.

The groove 21 has a larger width at the far side of the rotational axis X than the width at the near side of the rotational axis X. The first seal 22 has a cross section with a proximal end portion thereof being thicker than a distal end portion thereof. The first seal 22 is inserted into the groove 21 from a direction along the rotational axis X, thereby to be supported in a retained condition.

The groove 21 has a larger width at the bottom portion (width in the circumferential direction) than a groove opening width (width in the circumferential direction) to have an L-shape cross section forming a contacting portion 21B acting as a retainer. The first seal 22 is made of a resin material that is elastically deformable having a plate-like shape as a whole. The first seal 22 includes a narrowed sealing surface 22A at a distal end thereof to extend between the pair of partition walls 11, and limiting portion 22E acting as a retainer integrally formed with a proximal end thereof corresponding to the cross section of the groove 21. Further, a plurality of spring portions 22F acting as urging elements and a plurality of projections 22G are formed integrally with the proximal end thereof. It should be noted that the spring portions 22F are not necessarily formed integrally with the first seal 22, but may be provided as springs separated from the first seal 22 using a metal spring material.

The spacer 24 has a projection 24A formed therein, and engageable recesses 24B formed in portions of the projection 24A in the vicinity of the first seal 22 for receiving the second seal 25. Further, similarly to the first seal 22, the spacer 24 includes limiting portion 24E acting as a retainer formed integrally with a proximal portion thereof corresponding to the cross section of the groove 21. The second seal 25 includes a sealing surface 25A formed in the inner periphery thereof.

In assembling the rotary valve V, the first seal 22 is inserted into each of the plurality of grooves 21, the second seal 25 is inserted along the valve casing portion Ca, and the spacer 24 is inserted into the groove 21. By repeating such an assembling operation with respect to the four sets of members, the first seals 22 are arranged in the position corresponding to the first port P1 and the position corresponding to the outlet port P3, and the second seals 25 are arranged in the outside of the position corresponding to the first port P1 and the outlet portion 3. Further, the second seal 25 is engaged with the engageable recesses 24B of the spacer 24 thereby to be positioned in the direction of the rotational axis.

Then, the rotor R is inserted into the interior of the valve case portion Ca of the casing C, connected to the electric motor M at one end thereof, and connected to a bearing (not shown), for example, to be rotatably supported.

The rotary valve V assembled in this manner is prevented from falling off by bringing the limiting portion 22E of the first seal 22 into contact with the contacting portion 21B of the groove 21.

In particular, since the spring portions 22F of the first seal 22 exert the urging force on the first seal 22 in the projecting direction, the sealing surface 22A comes into contact with the valve portion 12 with appropriate pressure. Further, when the first seal 22 is displaced in a pressed direction like when the rotary valve V is vibrated, the projections 22G are brought into contact with the bottom wall of the groove 21, thereby to restrain excessive displacement of the first seal 22.

When the rotor R is rotated to bring the valve portion 12 to the position of the first port P1, the first seals 22 come into contact with opposite ends of the valve portion 12 in the circumferential direction, and the second seals 25 come into contact with the reference areas 11A of the outer circumference of the partition walls 11, thereby to completely shut off the air flow. In particular, the lower first seal 22 is brought into the region where the cut-out portion 12A is not provided to allow the first port P1 to be closed with the valve 12.

Similarly, when the rotor R is rotated to bring the valve portion 12 to the position of the outlet port P3, the outlet port P3 may be closed with the valve portion 12 in the same manner as the first port P1, but is actually not completely closed as described later. More particularly, in the outlet port P3, the positional relationship is maintained for allowing air intake to the outlet port P3 through the cut-out portion 12A of the valve portion 12 while one of the first seals 22 serves to completely shut off the air flow.

In the second embodiment, similarly to the first embodiment, control is performed to determine the rotating angle of the rotary valve V depending on the idling state, super-slow-speed rotation state, low-speed rotation state, mid-speed rotation state and high-speed rotation state of the engine.

Thus, according to the air-intake apparatus for the internal combustion engine of the present invention, since the first seals 22 are provided in the inner surface of the casing C in the vicinity of the ports while the arc or annular second seals 25 are provided in the vicinity of the ports, air-flow control can be satisfactorily performed without being obstructed by the seals. Further, when the rotor R is rotated, the first seals 22 are brought into contact with the valve portion 12 when the valve portion 12 reaches the position of the ports, thereby to reduce the energy loss in the rotary valve. In addition, since the first seals 22 and the second seals 25 are provided in the inner surface of the casing C, any space for movement of the seals is not required between the inner surface of the casing and the outer surface of the rotor R, compared with the arrangement in which the seals are provided in the outer circumference of the rotor R, which can miniaturize the apparatus.

FURTHER EMBODIMENT

Figure 20:
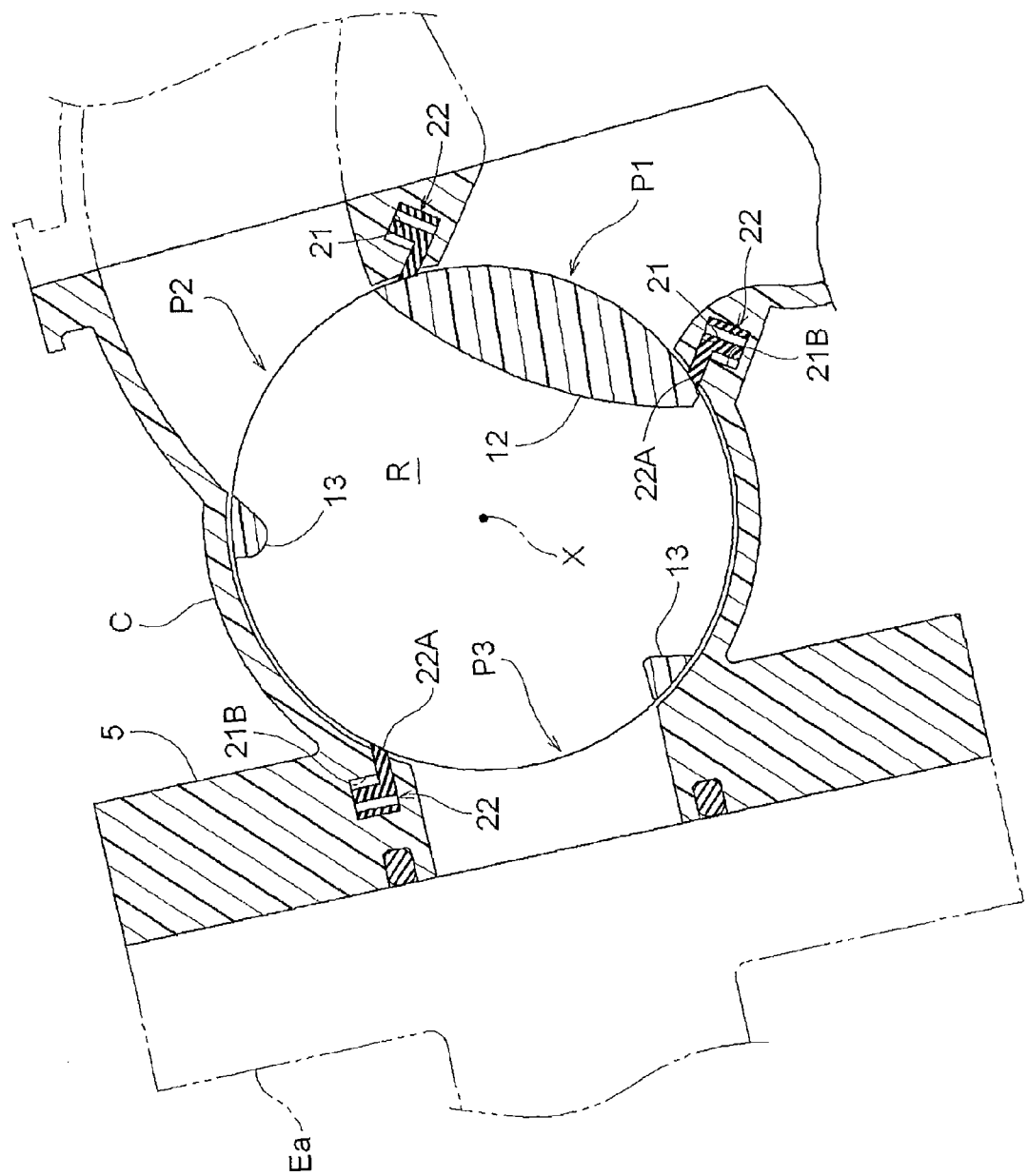
FIG. 20 is a cross section of a rotary valve according to another embodiment.

In the present invention, as shown in FIG. 20, the rotary valve V may be constructed dispensing with the lower one of the pair of first seals 22 to be arranged in the outlet port P3. With such a construction, even when water or oil is accumulated in a lower portion of the valve casing portion Ca of the casing C, it is possible to easily direct them to the direction of the air-intake portion Ea along with the flow of air intake without being obstructed by the seals.

INDUSTRIAL USABILITY

The present invention is applicable to all types of engines for performing air-intake operations.

DESCRIPTION OF REFERENCE SIGNS 6 first casing
7 second casing
12 valve portion
12A cut-out portion
21 groove
22 first seal
22A sealing surface
22F urging element (spring portion)
23 urging element (flat spring)
25 second seal
C casing
Ca valve casing portion
D1 first air-intake passage
D2 second air-intake passage
Ea air-intake portion
P1 first port
P2 second port
P3 outlet port
R rotor
T surge tank
V rotary valve
X rotational axis

The invention claimed is:

1. An air-intake apparatus for an internal combustion engine, comprising:
 a surge tank;
 a first air-intake passage communicating with the surge tank;
 a second air-intake passage communicating with the surge tank;
 a casing including a first port connected to the first air-intake passage, a second port connected to the second air-intake passage, and an outlet port connected to an air-intake portion of the internal combustion engine;
 a rotary valve including a rotor housed in a valve casing portion of the casing to be rotatable about a rotational axis, the rotary valve being configured to control air intake directed to the air-intake portion by rotation of the rotor;
 a first seal for sealing between the rotor and a surface of the valve casing portion facing the rotor with at least either one of the first port, second port and outlet port being closed;
 wherein the casing includes a first casing and a second casing;
 wherein the first casing and the second casing are connected to each other to form the valve casing portion;
 wherein the first seal is fitted into the first casing and the second casing before the first casing and the second casing are connected to each other; and
 wherein the rotor is arranged in the first casing or the second casing to assemble the rotary valve.

2. The air-intake apparatus for the internal combustion engine as claimed in claim 1, wherein the first seal is provided between an outer circumferential surface of the rotor and a surface of the valve casing portion facing the outer circumferential surface of the rotor.

3. The air-intake apparatus for the internal combustion engine as claimed in claim 1, wherein the first seal prevents the rotor from contacting the surface of the valve casing portion facing the rotor.

4. The air-intake apparatus for the internal combustion engine as claimed in claim 1, wherein the first seal is provided in the valve casing portion and projects toward the rotor.

5. The air-intake apparatus for the internal combustion engine as claimed in claim 1, wherein the first seal is provided with a linear sealing surface extending along the rotational axis.

6. The air-intake apparatus for the internal combustion engine as claimed in claim 1, wherein the first seal is urged toward the rotor by an urging element.

7. The air-intake apparatus for the internal combustion engine as claimed in claim 1, wherein an annular or arc second seal centering around the rotational axis is provided in the valve casing portion for sealing between the surface of the valve casing portion and a side surface or the outer circumferential surface of the rotor.

8. The air-intake apparatus for the internal combustion engine as claimed in claim 7, wherein the second seal is engageable with the first seal.

9. The air-intake apparatus for the internal combustion engine as claimed in claim 1,
 wherein a groove is formed in the valve casing portion along the rotational axis to have a larger width at the far side of the rotational axis than a width at the near side of the rotational axis in the circumferential direction of the rotational axis, and
 wherein the first seal is supported to the valve casing portion by inserting the first seal having a cross section with a width at a proximal end portion thereof being larger than a width at a distal end portion thereof into the groove from a direction along the rotational axis.

10. The air-intake apparatus for the internal combustion engine as claimed in claim 1, wherein the rotor includes a valve portion formed therein, and a cut-out portion is formed in the valve portion for allowing an air flow to the outlet port when the valve portion closes the outlet port.

* * * * *